Patented Nov. 8, 1938

2,135,642

UNITED STATES PATENT OFFICE 2,135,642

PROCESS FOR THE PRODUCTION OF DURABLE POLYSULPHIDE SOLUTIONS SUITABLE FOR INJECTION

Volkmar Klopfer, Dresden, Germany

No Drawing. Application May 7, 1936, Serial No. 78,516. In Germany March 6, 1933

2 Claims. (Cl. 167—72)

The sulphur injection preparations hitherto known are open to the objection that they only keep a limited time and are coarsely dispersed, or present the danger of foreign body action on account of the protecting colloids contained therein.

Consequently, the problem arose of producing a durable, clear preparation free from nitrogenous protecting colloids and suitable for injection, which preparation does not exert any secondary actions and when employed causes the formation of colloid sulphur only at the moment of injection by the action of the carbonic acid of the blood and of the lactic acid of the tissue.

It has been found that such solutions can be obtained by neutralizing aqueous solutions of polysulphides of the alkalis and of the alkaline earths, which on account of their alkaline reaction are themselves not suitable for injection, by adding grape sugar and subsequently heating in such a manner that the alkalinity of the solution is only so far distant from the blood alkalinity that no turbidity occurs through the formation of colloidal sulphur. The pH of the solution must therefore be adjusted to 7.8 to 8.0 in view of the fact that the pH of the blood amounts to 7.3 to 7.5. On the admission of carbonic acid or lactic acid—an action which occurs during injections—colloidal sulphur immediately separates.

It is known to add to polysulphide solutions higher molecular hydrocarbons, thereby obtaining alkaline solutions. A suitable injection preparation is only obtained if grape sugar is added to the polysulphide solution and the solution is heated to 100° C., until a pH content of 7.8 to 8.0 is obtained.

It is likewise known to make colloid solutions durable by protecting colloids, to which sugar belongs. In the present process grape sugar is not employed as protecting colloid, seeing that the process does not relate to a colloidal preparation.

It is also known to make alkali polysulphide solutions durable by adding substances with one or several hydroxyl groups; further by adding mixtures of substances which increase the viscosity of the solutions or act as protecting colloids, or by adding substances which form complex compounds with certain gases (carbonic acid or hydrogen sulphide).

The above mentioned mixtures cannot be used in the present process for the object in view as they have an alkaline action.

This preferably takes place employing small quantities of liquid, for example in ampullae, as when heated in large quantities grape sugar— polysulphide solutions tend to decompose in giving off sulphur. If not heated, the pH remains in excess of 8 and does not appreciably diminish. If the precautionary directions mentioned are not followed, the grape sugar certainly neutralizes the polysulphide, but at the same time the sulphur is expelled, because the polysulphide decomposes.

Example 5 cub. cms. of a sodium-polysulphide solution containing in 100 cub. cms. of solution 20 m. gms. of sulphur capable to be precipitated by lactic acid, are mixed with 195 cub. cms. of an aqueous solution containing 50 gms. of pure grape sugar and filled into ampullae. The ampullae, after having been closed by melting, are heated in a water bath to 100° C., boiled for one minute and then cooled. The mixture shows a pH (reaction) of 8.0 and, on the addition of small quantities of carbonic acid or lactic acid, produces a turbidity caused by the separated colloidal sulphur.

Calcium polysulphides or ammonium polysulphide solutions may be employed instead of sodium polysulphide solution.

I claim:

1. The process of preparing a solution of a polysulphide for injection purposes, the solution having a pH of 7.8 to 8 so that upon contact with the blood colloidal sulphur is formed, said process comprising heating an aqueous solution of a polysulphide and grape sugar in ampules at a temperature of about 100° C. and for a period of time sufficient to reduce the pH of the original mixture to the above stated value.

2. The process as in claim 1 wherein the polysulphide is sodium polysulphide.

VOLKMAR KLOPFER.